United States Patent
Trammell et al.

(10) Patent No.: US 10,279,824 B2
(45) Date of Patent: May 7, 2019

(54) VISUAL ASSIST FOR RAILCAR MOVER

(71) Applicant: Trackmobile LLC, La Grange, GA (US)

(72) Inventors: Thomas William Trammell, West Point, GA (US); Justin Ryan Mantle, Franklin, GA (US)

(73) Assignee: Trackmobile LLC, La Grange, GA (US)

( * ) Notice: Subject to any disclaimer, the term of this patent is extended or adjusted under 35 U.S.C. 154(b) by 0 days.

(21) Appl. No.: 15/673,930

(22) Filed: Aug. 10, 2017

(65) Prior Publication Data

US 2018/0043914 A1  Feb. 15, 2018

Related U.S. Application Data

(60) Provisional application No. 62/374,969, filed on Aug. 15, 2016.

(51) Int. Cl.
| | |
|---|---|
| *H04N 7/18* | (2006.01) |
| *B61L 25/08* | (2006.01) |
| *B61L 15/00* | (2006.01) |
| *G06K 9/00* | (2006.01) |
| *H04N 5/272* | (2006.01) |
| *B61L 23/04* | (2006.01) |
| *B61L 25/02* | (2006.01) |
| *H04N 5/232* | (2006.01) |

(Continued)

(52) U.S. Cl.
CPC ........... *B61L 25/08* (2013.01); *B61L 15/009* (2013.01); *B61L 15/0072* (2013.01); *B61L 23/041* (2013.01); *B61L 25/025* (2013.01); *G06K 9/00791* (2013.01); *H04N 5/23238* (2013.01); *H04N 5/272* (2013.01); *B60F 1/04* (2013.01); *H04N 5/23293* (2013.01); *H04N 5/247* (2013.01)

(58) Field of Classification Search
CPC ...... B60F 1/04; B61L 15/0072; B61L 15/009; B61L 23/041; B61L 25/025; B61L 25/08; G06K 9/00791; H04N 5/23293; H04N 5/247; H04N 5/272
USPC ............................................. 348/148
See application file for complete search history.

(56) References Cited

U.S. PATENT DOCUMENTS

| | | | |
|---|---|---|---|
| 2005/0259158 A1* | 11/2005 | Jacob | H04N 3/1562 348/218.1 |
| 2014/0111637 A1* | 4/2014 | Zhang | B60R 1/088 348/118 |

(Continued)

OTHER PUBLICATIONS

Website: Picture Views from youtube.com of "ASL360 Surround View System—London Bus," published on Jan. 24, 2013, <https://www.youtube.com/watch?v=FSUMQRI-JSo>>, 3 pp.

*Primary Examiner* — Farzana Hossain
(74) *Attorney, Agent, or Firm* — Banner & Witcoff, Ltd.

(57) ABSTRACT

A system for visually assisting an operator of a railcar mover that provides a visual display and a pair of alignment lines superimposed on the image of the display to assist the operator to properly align a railcar mover to the railroad rails when transitioning from driving on the road to driving on the railroad rails. The system further includes a set of cameras positioned around the railcar mover and a processor, which can create a composite image of a top view of the railcar mover to further assist the operator position the railcar mover properly.

20 Claims, 5 Drawing Sheets

(51) Int. Cl.
*B60F 1/04* (2006.01)
*H04N 5/247* (2006.01)

(56) References Cited

U.S. PATENT DOCUMENTS

| | | | |
|---|---|---|---|
| 2014/0333729 A1* | 11/2014 | Pflug | G06T 15/20 348/47 |
| 2015/0332098 A1* | 11/2015 | Wang | G06T 7/73 382/103 |
| 2016/0214620 A1* | 7/2016 | Yang | B60W 40/13 |
| 2016/0368417 A1* | 12/2016 | Bassi | H04N 9/09 |
| 2017/0132476 A1* | 5/2017 | Chien | G06K 9/00791 |
| 2017/0132482 A1* | 5/2017 | Kim | B60K 35/00 |

* cited by examiner

VISUAL ASSIST FOR RAILCAR MOVER

CROSS-REFERENCE TO RELATED APPLICATION

This application claims priority to U.S. Provisional Application No. 62/374,969 filed on Aug. 15, 2016. The above referenced application is incorporated by reference in its entirety.

FIELD OF INVENTION

The field of invention for this disclosure relates to a device to visually assist an operator of a railcar mover.

BACKGROUND

Railcar movers provide a more efficient way to move railcars around within a rail yard than using a locomotive for such tasks. Having both the ability to travel on and off the rails is just one of the advantages. However, when transitioning from driving on the road to driving on the railroad rails, aligning the railcar mover to the railroad rails may be difficult. A device to visually assist the operator to ensure the railcar mover is aligned properly to the railroad rails prior to engaging the railroad rails with the rail wheel assemblies would be beneficial.

BRIEF SUMMARY

Aspects of this disclosure may relate to a system for visually assisting an operator of a railcar mover comprising: a processor, a plurality of cameras connected to the processor, and a visual display located in a cab of the railcar mover connected to the processor. The processor may include a processing unit and a system memory to store and execute instructions. The plurality of cameras may include at least one camera positioned on a front side of the railcar mover, a rear side of the railcar mover, a left side of the railcar mover, and a right side of the railcar mover. The orientation of each of the plurality of cameras may be calibrated such that an exact position of each of the plurality of cameras on the railcar mover is accurately transmitted to the processor. The system may also include a non-transitory computer readable medium storing computer readable instructions that, when executed by the processor, causes the processor to at least perform the following steps: receive data from the plurality of cameras; integrate the data from the plurality of cameras and create an image of a composite top view having a perspective above the railcar mover, wherein the processor uses the data received from the plurality of cameras and an overall dimension of the railcar mover combined with the exact location of each of the plurality of cameras to create the image of the composite top view; calculate a location of the railcar mover on the image; superimpose a representative railcar mover onto the image; superimpose alignment lines over the representative railcar mover, wherein the alignment lines are parallel lines that are spaced to represent a width of a rail wheel assembly of the railcar mover; and output the image, the representative railcar mover, and the alignment lines to the visual display. Additionally, the plurality of cameras may comprise a first camera on the front side of the railcar mover, a second camera on the rear side of the railcar mover, a third camera on the left side of the railcar mover, and a fourth camera on the right side of the railcar mover. The system may also include four additional cameras that are placed near the corners of the railcar mover to further maximize a field of view of the plurality of cameras.

Additionally, other aspects of the disclosure may include alignment lines that may have a contrasting color to the image on the visual display to provide a high visibility element to further assist the operator, where the operator can select the contrasting color of the alignment lines. The alignment lines may have a length that extend beyond a length of the representative image of the railcar mover. Also, the alignment lines may be spaced to represent a width of railroad rails and be aligned with the railcar mover wheel assemblies. In addition, the non-transitory computer readable medium stores computer readable instructions when executed by the processor, may further cause the processor to superimpose a first label over a front of the representative railcar mover on the image, or superimpose a second label over a front of the representative railcar mover on the image. Lastly, at least one of the plurality of cameras may have the ability to view in an infrared spectrum.

Other aspects of this disclosure may relate to a system for visually assisting an operator of a railcar mover comprising: a plurality of cameras, wherein a first camera is on a front side of the railcar mover, a second camera is on a rear side of the railcar mover, a third camera is on a left side of the railcar mover, and a fourth camera is on a right side of the railcar mover, a processor connected to the plurality of cameras, a visual display on the railcar mover connected to the processor, and a non-transitory computer readable medium storing computer readable instructions that, when executed by the processor, causes the processor to at least: receive data from the plurality of cameras, create an image of a top view with a perspective above the railcar mover, calculate a location of the railcar mover on the image, superimpose a representative railcar mover onto the image, and output the image, the representative railcar mover, and the alignment lines to the visual display. The non-transitory computer readable medium stores computer readable instructions when executed by the processor, may further cause the processor to at least: superimpose alignment lines onto the representative railcar mover, wherein the alignment lines are parallel lines that are spaced to represent a width of a rail wheel assembly of the railcar mover. Lastly, the plurality of cameras may have a wide angle lens.

BRIEF DESCRIPTION OF THE DRAWINGS

The present invention is illustrated by way of example and not limited in the accompanying figures in which like reference numerals indicate similar elements and in which.

Further, it is to be understood that the drawings may represent the scale of different components of one single embodiment; however, the disclosed embodiments are not limited to that particular scale.

DETAILED DESCRIPTION

In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "front," "back," "side," "rear," and the like may be used in this specification to describe various example features and elements of the invention, these terms are used herein as a matter of convenience, e.g., based on the example orientations shown in the figures or the orientation during typical use. Nothing in this specification should be construed as requiring a specific three dimensional orientation of structures in order to fall within the scope of this invention. Also, the reader is advised that the attached drawings are not necessarily drawn to scale.

The following terms are used in this specification, and unless otherwise noted or clear from the context, these terms have the meanings provided below.

"Plurality" indicates any number greater than one, either disjunctively or conjunctively, as necessary, up to an infinite number.

In the following description of the various embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made without departing from the scope and spirit of the present disclosure.

Figure 1:
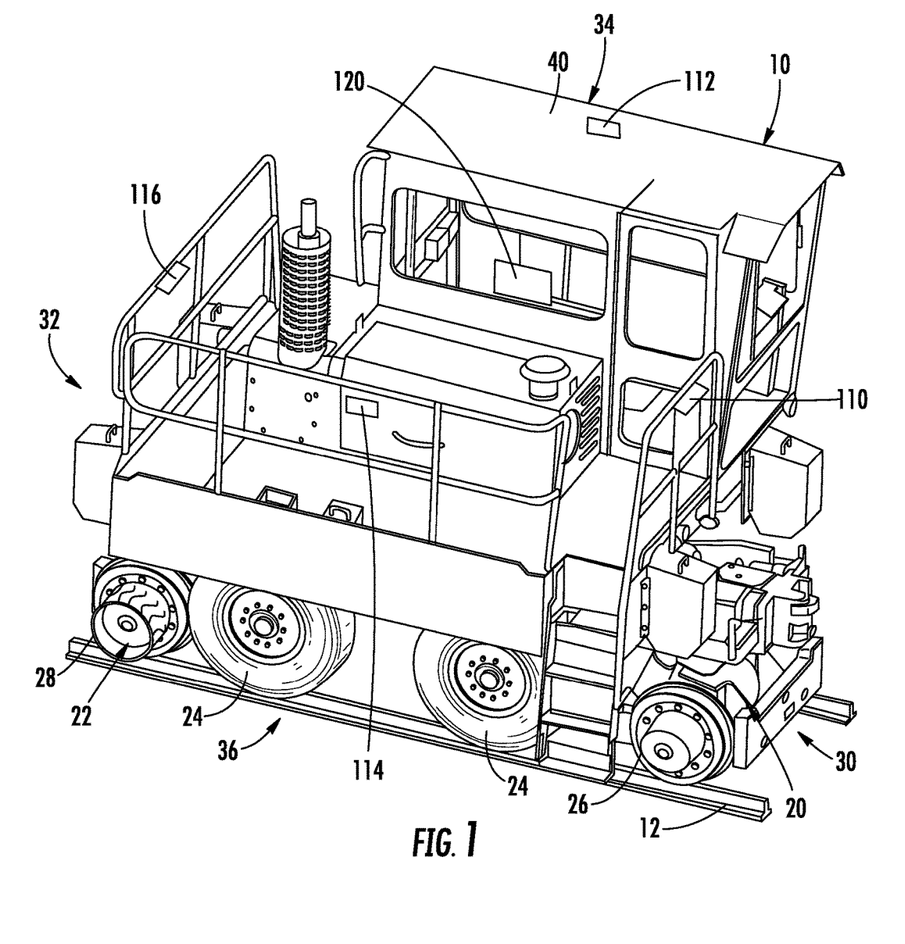
FIG. 1 depicts an isometric view of the railcar mover with the visual assist system of FIG. 1, according to one or more aspects described herein.

FIG. 1 depicts an isometric view of an example railcar mover 10 having the visual assist system 100, according to one or more aspects described herein. The railcar mover 10 may include a first drive axle assembly 20 and a second drive axle assembly 22 that provides the main traction and movement for the railcar mover 10 when moving along the railroad rails 12. The first drive axle assembly 20 and the second drive axle assembly 22 may each include a set of rail wheel assemblies 26, 28 that engage the rails 12 during operation of the railcar mover 10. The first drive axle assembly 20 and the second drive axle assembly 22 may include drive motors, wheel assemblies, and gearboxes as known and used in the art. The railcar mover 10 may also include one or more pairs of road wheels 24 and road wheel drive axle assemblies that may be utilized for the railcar mover 10 when the railcar mover is moving along the road or ground. The road wheels 24 may be positioned above the first drive axle assembly 20 and the second drive axle assembly 22 when the railcar mover 10 is moving the rails 12.

The railcar mover 10 may have a front side 30, a rear side 32, a left side 34, and a right side 36. The visual assist system 100 may comprise a plurality of cameras 110, 112, 114, 116 that are positioned around the exterior of the railcar mover 10. For example, in FIG. 1, a first camera 110 may be positioned on a front side 30, a rear or second camera 116 positioned on a rear side 32, a third camera 112 positioned on a left side 34, and a fourth camera 114 positioned on a right side 36. The plurality of cameras 110, 112, 114, 116 may be positioned near the center of each of the sides of the railcar mover 10. Alternatively, the plurality of cameras 110, 112, 114, 116 may be positioned anywhere on each of the sides of the railcar mover 10. While the exemplary visual assist system 100 includes four cameras 110, 112, 114, 116, optionally, any number of cameras may be used such as five, six, eight, or even twelve cameras. For example, four additional cameras may be placed near the corners of the railcar mover 10 to further maximize the field of view of the cameras.

Figure 2:
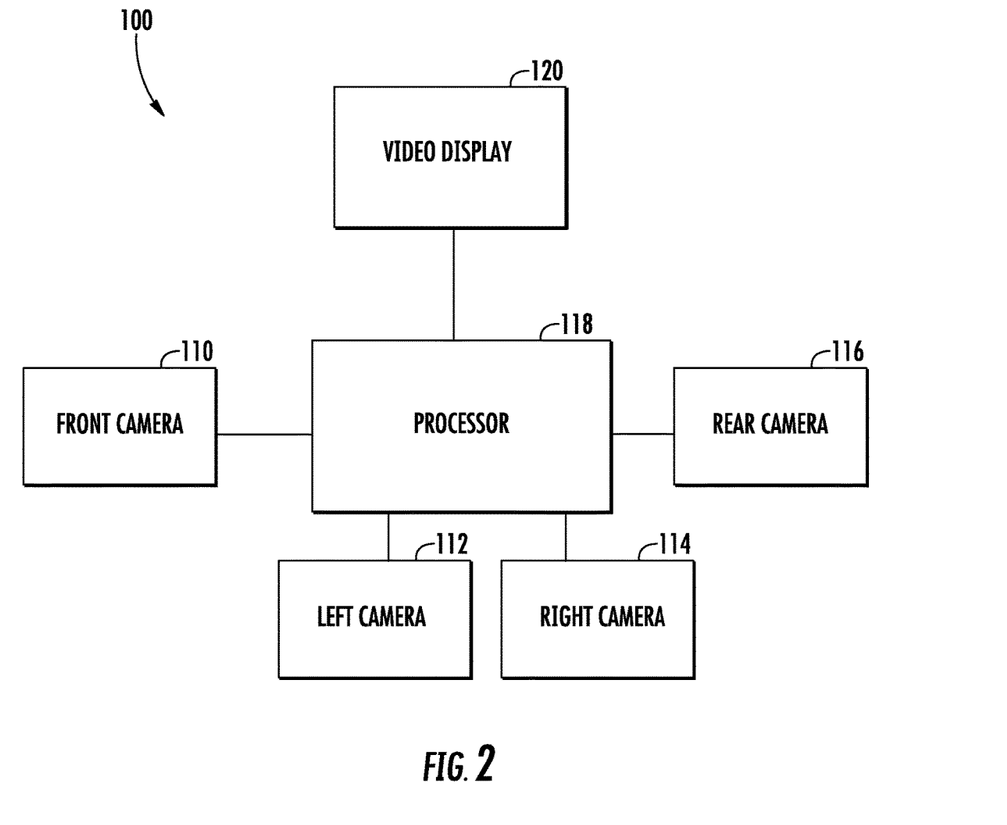
FIG. 2 depicts a schematic of the visual assist system, according to one or more aspects described herein.

FIG. 2 shows a diagram of the visual assist system 100 comprising a plurality of cameras 110, 112, 114, 116 that may output video data to a processor 118. The processor 118 may integrate the video data from the plurality of cameras 110, 112, 114, 116 and transmit or output an image to a video display 120 located within the cab 40 of the railcar mover 10.

The video display 120 may produce an image of the video data from each of the cameras 110, 112, 114, 116 individually on the video display 120 so the operator can see real-time the view from any of the plurality of cameras 110, 112, 114, 116 to improve the operator's overall visibility around the entire railcar mover 10. In addition, the processor 118 may create a composite top view showing a perspective from above the railcar mover 10 and the railroad rails 12 on the video display 120. The composite top view of the railcar mover 10 and the railroad rails 12 may assist the operator to properly align the railcar mover 10 as the operator transitions the railcar mover 10 from an operating mode for driving on a road to driving on the railroad rails 12.

Figure 3:
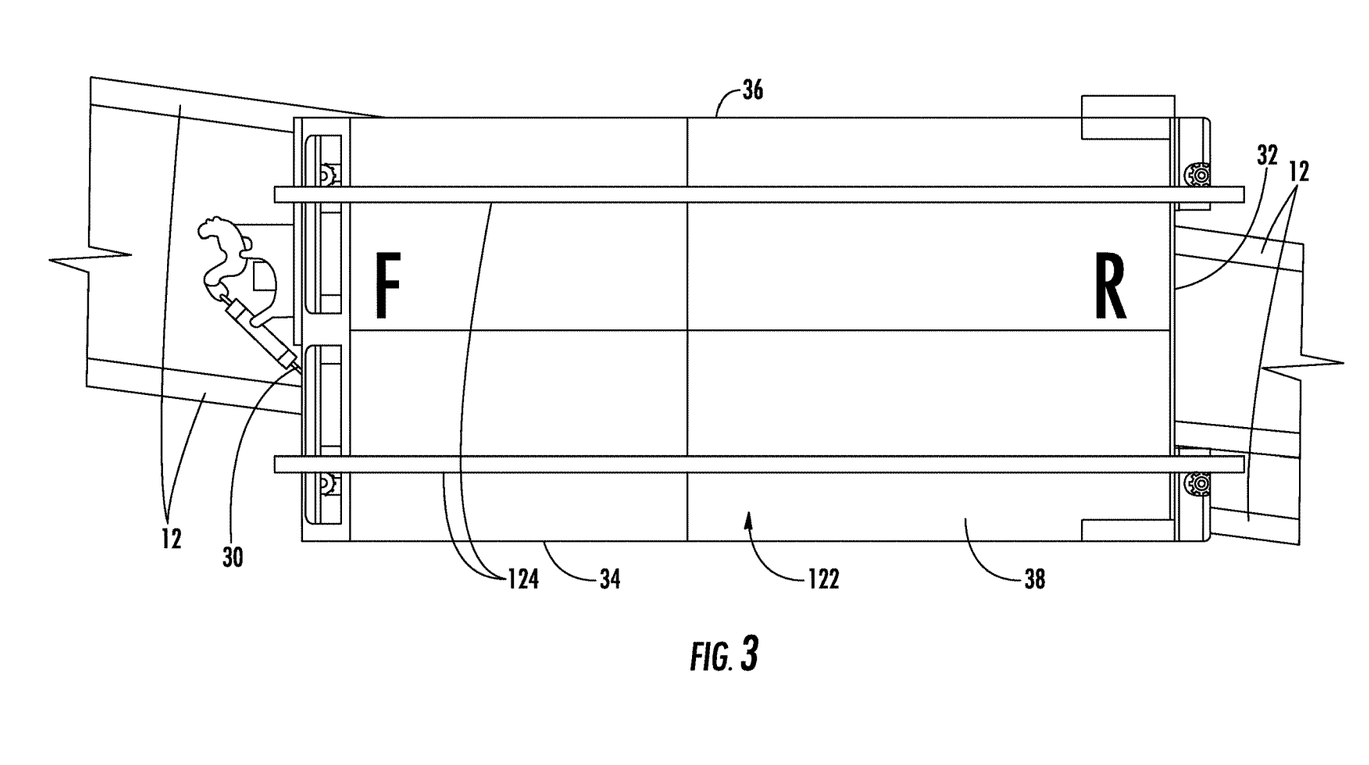
FIG. 3 depicts an exemplary view of the display of the visual assist system of FIG. 1, according to one or more aspects described herein.
Figure 4:
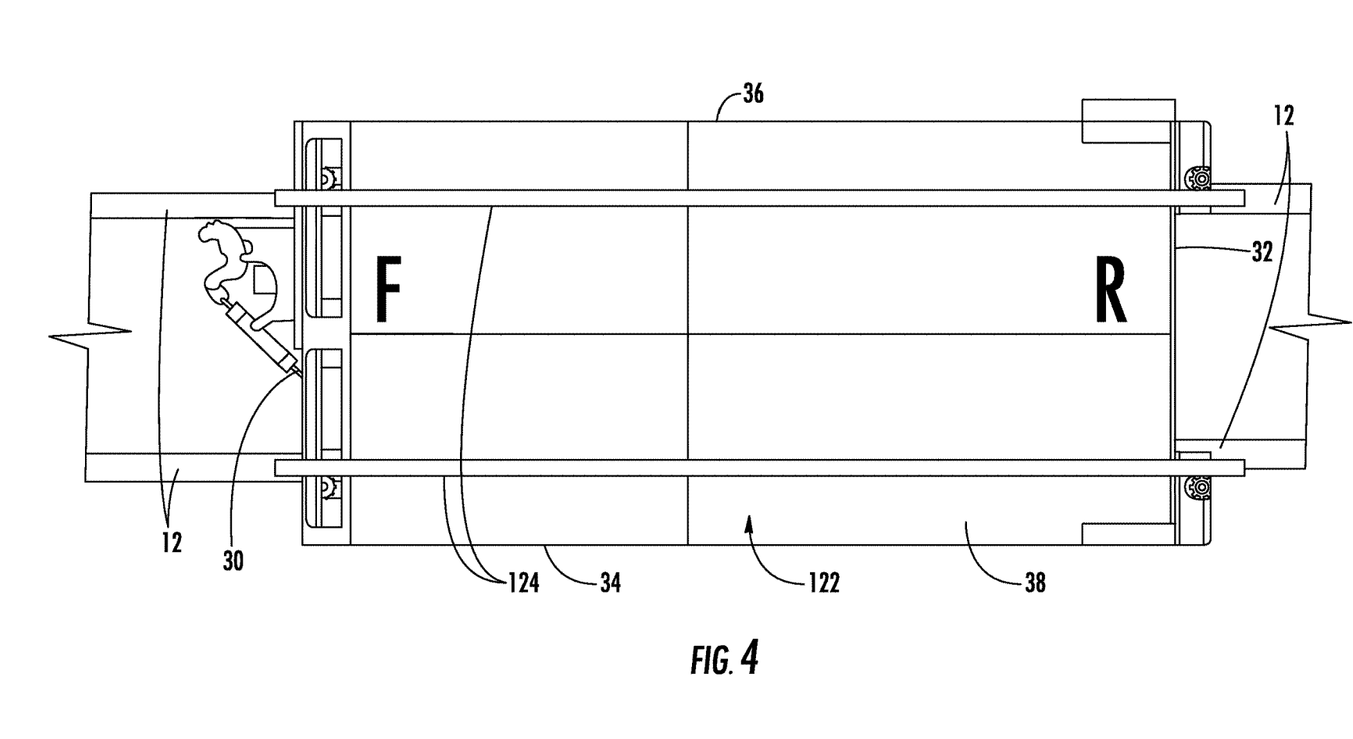
FIG. 4 depicts an exemplary view of the display of the visual assist system of FIG. 1, according to one or more aspects described herein.

For example, FIGS. 3 and 4 show exemplary views of a representative top view 122 of the railcar mover 10 on the video display 120. The video display 120 shows a representative top view 122 of the railcar mover 10 such that the operator can easily distinguish the front side 30, the rear side 32, the left side 34, the right side 36, and the top side 38 of the railcar mover 10 in relation to the railroad rails 12. The processor 118 and the video display 120 may also display alignment lines 124 superimposed upon the representative top view 122 of the railcar mover 10 which represent virtual railroad rails. The alignment lines 124 may be a pair of parallel lines that are spaced to represent the width of the railroad rails 12 as well as the width of rail wheel assemblies 26, 28 for the railcar mover 10. Each of the alignment lines 124 may be aligned with one of the rail wheel assemblies 26, 28 on either side of the railcar mover 10. In addition, the alignment lines 124 may have a length that is longer than the length of the representative top view 122 of the railcar mover 10 or may have a length that extends beyond the representative top view 122 of the railcar mover 10 to make it easier for the operator to align the alignment lines 124 with the railroad rails 12. Since the alignment lines 124 move with the representative top view 122 of the railcar mover 10, the operator may observe movement of the representative top view 122 of the railcar mover 10 on the visual display 120 and adjust the railcar mover 10 into proper alignment with the railroad rails 12. The operator can be assured of the railcar mover 10 is in proper alignment with the railroad rails 12 when the alignment lines 124 are collinear with the railroad rails 12 as shown in FIG. 4. The alignment lines 124 may be a contrasting color to provide a high visibility element on the display to further assist the operator. The alignment lines 124 may be any color such as red, yellow, blue, or any color to contrast well with the background and contrast with the representative top view 122 of the railcar mover 10. Optionally, the operator may select the color of the alignment lines 124 to suit their individual needs.

As another option, the processor may also superimpose a first label such as "F" for front and a second label such as "R" for rear onto the representative top view 122 such that the operator can easily distinguish the front side 30 and the rear side 32 of the railcar mover 10 on the representative top view 122 on the video display 120.

FIG. 3 illustrates an exemplary view of the video display 120 where the representative top view 122 of the railcar mover 10 is misaligned with the railroad rails 12 as the alignment lines 124 and the railroad rails 12 form an angle. An operator would see this misalignment of the railcar mover 10 on the railroad rails 12 in the video display 120 and make the necessary corrections and adjustments to align the railcar mover 10 with the railroad rails 12.

FIG. 4 illustrates an exemplary view of the video display 120 where the representative top view 122 of the railcar mover 10 is aligned with the railroad rails 12 as the alignment lines 124 and the railroad rails 12 are collinear. An operator would see that the railcar mover 10 is aligned with the railroad rails 12 and proceed to engage the rail wheel assemblies to the rails 12.

Figure 5:
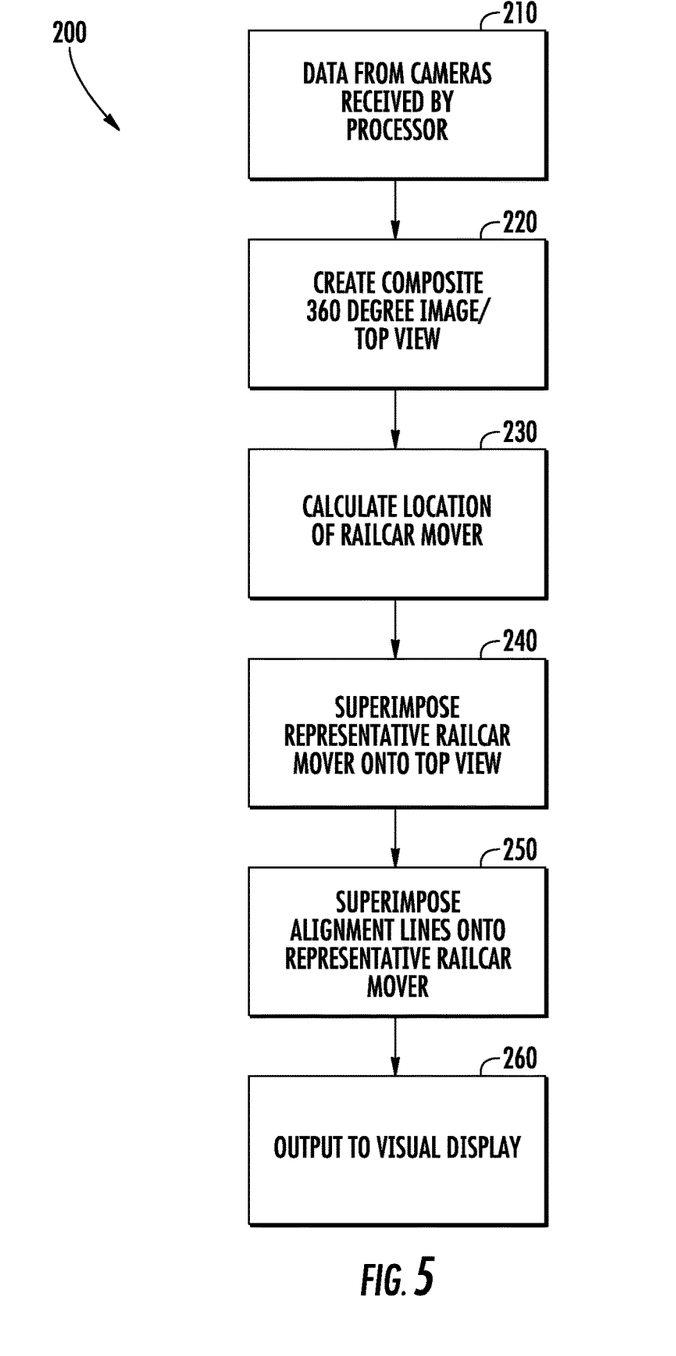
FIG. 5 is an illustrative flowchart of the process for creating the visual display of the visual assist system of FIG. 1, according to one or more aspects described herein.

FIG. 5 shows the process 200 for creating the composite top view 122 of the railcar mover 10. In the first step 210, the video data from the plurality of cameras 110, 112, 114, 116 may be received by the processor 118. In the next step 220, the processor 118 may then assimilate the video data from each camera to create a composite view comprising a top or "bird's eye" view 122. In the next step 230, by using the known dimensions of the railcar mover 10 along with the location of the cameras 110, 112, 114, 116, the processor 118 may calculate the location of the railcar mover 10 on the image or composite top view 122. In step 240, the processor 118 may then superimpose the representative railcar 122 onto the composite top view 122. In step 250, the processor 118 may then superimpose the alignment lines 124 onto the composite top view 122. In the next step 260, the processor 118 may output the image and composite top view 122 to the visual display 120.

Each camera 110, 112, 114, 116 may have a wide angle lens to maximize the amount of area around the railcar mover 10 captured by the cameras. Additionally, each camera 110, 112, 114, 116 may have an infrared capability to allow for operation in low lighting conditions.

As discussed above, to create the representative top view 122 of the railcar mover 10, the processor 118 may use the overall dimensions of the railcar mover 10 combined with the exact location of each camera 110, 112, 114, 116. The overall dimensions of the railcar mover 10 may include the location of the front side 30, the rear side 32, the left side 34, the right side 36, and the location of the rail wheel assemblies 26, 28. The position and orientation of each camera 110, 112, 114, 116 may be calibrated such that the exact position of each camera 110, 112, 114, 116 is accurately transmitted to the processor 118.

The processor 118 may be utilized to process data received from the plurality of cameras 110, 112, 114, 116. The processor 118 may be a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The one or more implementations described throughout this disclosure may utilize logical blocks, modules, and circuits that may be implemented or performed with a processor.

The processor 118 may be used to implement various aspects and features described herein. As such, the processor 118 may be configured to perform any desired operation on one or more data streams received from the plurality of cameras 110, 112, 114, 116. Further, it will be appreciated that the processor 118 may execute multiple calculations, in parallel or serial, at a very high throughput frequency using the received data from the sensor's components, in order to analyze the movement of the railcar mover 10 in relation to the railroad rails 12. As such, processor 118 may be configured to execute hundreds of thousands, millions, or billions or more calculations per second. The processor 118 may include a processing unit and system memory to store and execute software instructions.

While the invention has been described with respect to specific examples including presently preferred modes of carrying out the invention, those skilled in the art will appreciate that there are numerous variations and permutations of the above described systems and methods. Thus, the spirit and scope of the invention should be construed broadly as set forth in the appended claims.

What is claimed is:

1. A system for visually assisting an operator of a railcar mover comprising:
   a processor that includes a processing unit and a system memory to store and execute instructions;
   a plurality of cameras connected to the processor, wherein at least one camera is positioned on a front side of the railcar mover, a rear side of the railcar mover, a left side of the railcar mover, and a right side of the railcar mover, wherein an orientation of each of the plurality of cameras are calibrated such that an exact position of each of the plurality of cameras on the railcar mover is accurately transmitted to the processor;
   a visual display located in a cab of the railcar mover connected to the processor; and
   wherein the system memory includes a non-transitory computer readable medium storing computer readable instructions that, when executed by the processor, causes the processor to at least:
   receive real-time images data from the plurality of cameras,
   integrate the data from the plurality of cameras and create a real-time composite image of a composite top view having a perspective above the railcar mover, wherein the processor uses the real-time images received from the plurality of cameras and an overall dimension of the railcar mover combined with an exact location of each of the plurality of cameras to create the real-time composite image of the composite top view, calculate a location of the railcar mover on the real-time composite image,
   superimpose a representative railcar mover onto the real-time composite image, superimpose alignment lines over the representative railcar mover, wherein the alignment lines are parallel lines that are spaced to represent a width of a rail wheel assembly of the railcar mover, and output, in real-time, the real-time composite image, the representative railcar mover, and the alignment lines to the visual display.

2. The system for visually assisting an operator of a railcar mover of claim 1, wherein the plurality of cameras comprise a first camera on the front side of the railcar mover, a second camera on the rear side of the railcar mover, a third camera on the left side of the railcar mover, and a fourth camera on the right side of the railcar mover.

3. The system for visually assisting an operator of a railcar mover of claim 2, wherein the plurality of cameras includes four additional cameras that are placed near corners of the railcar mover to further maximize a field of view of the plurality of cameras.

4. The system for visually assisting an operator of a railcar mover of claim 1, wherein the alignment lines have a contrasting color to the real-time composite image on the visual display to provide a high visibility element to further assist the operator and the operator can select the contrasting color of the alignment lines.

5. The system for visually assisting an operator of a railcar mover of claim 1, wherein the non-transitory computer readable medium stores computer readable instructions when executed by the processor, further cause the processor to at least:
superimpose a first label over a front of the representative railcar mover on the real-time composite image, and
superimpose a second label over a rear of the representative railcar mover on the real-time composite image.

6. The system for visually assisting an operator of a railcar mover of claim 1, wherein the overall dimensions of the railcar mover include the location of the front side, the rear side, the left side, the right side, and the location of a pair of rail wheel assemblies.

7. The system for visually assisting an operator of a railcar mover of claim 1, wherein at least one of the plurality of cameras has an ability to view in an infrared spectrum.

8. The system for visually assisting an operator of a railcar mover of claim 1, wherein the alignment lines have a length that extends beyond a length of the representative railcar mover.

9. A system for visually assisting an operator of a railcar mover comprising:
a plurality of cameras, wherein a first camera is on a front side of the railcar mover, a second camera is on a rear side of the railcar mover, a third camera is on a left side of the railcar mover, and a fourth camera is on a right side of the railcar mover;
a processor connected to the plurality of cameras, a visual display on the railcar mover connected to the processor, and a non-transitory computer readable medium storing computer readable instructions that, when executed by the processor, causes the processor to at least:
receive real-time images data from the plurality of cameras,
integrate the real-time images data from the plurality of cameras and create a real-time composite image of a composite top view having a perspective above the railcar mover using the real-time images data from the plurality of cameras, calculate a location of the railcar mover on the real-time composite image, superimpose a representative railcar mover onto the real-time composite image, superimpose alignment lines onto the representative railcar mover, wherein the alignment lines are a pair of parallel lines that are spaced to represent a width of railroad rails and wherein each of the alignment lines are aligned with a rail wheel assembly of the railcar mover, and output, in real-time, the real-time composite image, the representative railcar mover, and the alignment lines to the visual display.

10. The system for visually assisting an operator of a railcar mover of claim 9, wherein the alignment lines have a contrasting color to the real-time composite image on the visual display to provide a high visibility element to further assist the operator.

11. The system for visually assisting an operator of a railcar mover of claim 10, wherein the operator can select the contrasting color of the alignment lines.

12. The system for visually assisting an operator of a railcar mover of claim 9, wherein the non-transitory computer readable medium stores computer readable instructions when executed by the processor, further cause the processor to at least:
superimpose a first label over a front of the representative railcar mover on the real-time composite image, and
superimpose a second label a first label over a front of the representative railcar mover on the real-time composite image.

13. The system for visually assisting an operator of a railcar mover of claim 9, wherein at least one camera of the plurality of cameras has an ability to view in an infrared spectrum.

14. The system for visually assisting an operator of a railcar mover of claim 9, wherein the alignment lines have a length that extend beyond a length of the representative railcar mover.

15. A system for visually assisting an operator of a railcar mover comprising:
a plurality of cameras, wherein at least one camera is positioned on a front side of the railcar mover, a rear side of the railcar mover, a left side of the railcar mover, and a right side of the railcar mover;
a processor connected to the plurality of cameras; a visual display located in a cab of the railcar mover connected to the processor; and a non-transitory computer readable medium storing computer readable instructions that, when executed by the processor, causes the processor to at least:
receive real-time images data from the plurality of cameras,
integrate the real-time images data from the plurality of cameras and create a real-time composite image of a composite top view having a perspective above the railcar mover using the real-time images data from the plurality of cameras, calculate a location of the railcar mover on the real-time composite image,
superimpose a representative railcar mover onto the real-time composite image, superimpose alignment lines onto the representative railcar mover, wherein the alignment lines are parallel lines that are spaced to represent a width of railroad rails and wherein the alignment lines have a length that extends beyond a length of the representative railcar mover.

16. The system for visually assisting an operator of a railcar mover of claim 15, wherein the alignment lines have a contrasting color to the real-time composite image on the visual display to provide a high visibility element to further assist the operator.

17. The system for visually assisting an operator of a railcar mover of claim 16, wherein the operator can select a color of the alignment lines.

18. The system for visually assisting an operator of a railcar mover of claim 15, wherein the non-transitory computer readable medium stores computer readable instructions when executed by the processor, further cause the processor to at least:

superimpose a first label onto a front of the representative railcar mover, and superimpose a second label onto a rear of the representative railcar mover.

19. The system for visually assisting a railcar mover of claim 15, wherein the at least one camera of the plurality of cameras has an ability to view in an infrared spectrum.

20. The system for visually assisting an operator of a railcar mover of claim 15, wherein at least one of the plurality of cameras have a wide angle lens.

* * * * *